Jan. 8, 1957 W. E. CROTTY 2,776,652

DEVICE FOR REDUCING WEAR BETWEEN POPPET VALVES AND THEIR ACTUATING DEVICES

Filed Feb. 4, 1954

INVENTOR.
WILLARD E. CROTTY
BY Ray S. Pyle
atty

United States Patent Office 2,776,652

Patented Jan. 8, 1957

1

2,776,652

DEVICE FOR REDUCING WEAR BETWEEN POPPET VALVES AND THEIR ACTUATING DEVICES

Willard E. Crotty, Quincy, Mich., assignor to Crotty Corporation, a corporation of Michigan Application February 4, 1954, Serial No. 408,255

2 Claims. (Cl. 123—188)

This invention relates in general to devices for reducing wear between poppet valves and their actuating devices, and relates more specifically to an intermediate device to be positioned between the valve stem and actuating device.

While the invention will be hereinafter specifically described in connection with a device for reducing wear between a poppet valve and the actuating device therefor, it should be understood that the devices of this invention are not limited to any particular usage since they are capable of like function between any similar members.

This invention should not be confused with devices for imparting positive rotation to valves. With this invention, the intermediate member is provided to be an expendable wear member, and is adapted to shift its position by a flutter action caused by external forces acting upon the device during the brief periods of time that the actuation device withdraws far enough to allow an air gap to appear between the parts. If desired, other valve rotation devices may be employed with this invention.

It is, therefore, an object of this invention to provide a shim device between a valve stem and the actuation device for the valve, which shim device is free to turn at will by random natural forces.

Another object of this invention is to provide such shim device in the form of a cupped cap with magnetic means to cause the cap to be attracted to associated members.

Still another object of this invention is to provide a cup member to collect an oil pocket and thus present an oil cushion.

Yet another object of this invention is to provide such shim member of magnetized material for the dual function of setting up opposed attraction forces which will cause the cap to cling first to one associated member and then the other, and to collect magnetizable ferrous bits and dust which would otherwise contaminate the oil.

And another object of this invention is to provide rotation motive force for a sacrifice shim between separable members by magnetizing said shim and permitting the shim to be attracted in random order first to one associated member and then the other by interfering with the magnetic action by a changing oil film.

Other objects and a fuller understanding of the invention may be had by referring to the following description and claims, taken in conjunction with the accompanying drawing, in which:

Figure 1:
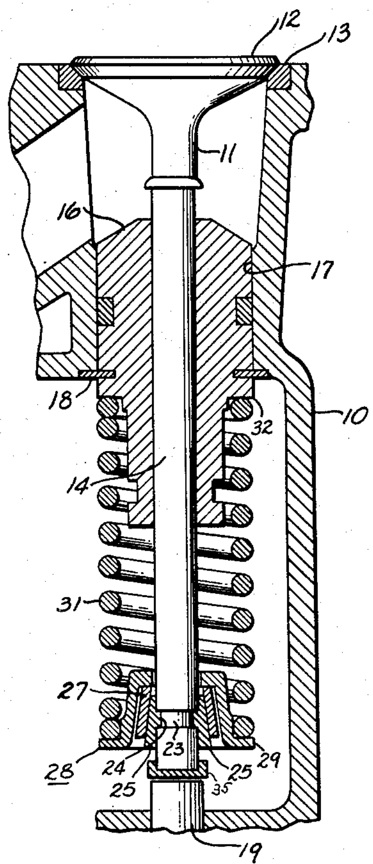
Figure 1 is a fragmentary vertical cross-sectional view of an internal combustion engine showing a valve assembly incorporating the present invention.
Figure 2:
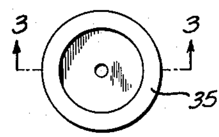
Figure 2 is a top view of the preferred embodiment of the present invention.
Figure 3:
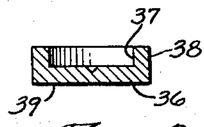
Figure 3 is a cross-sectional view taken along line 3—3 of Figure 2.

Referring now particularly to the accompanying drawings, the reference character 10 indicates generally the cylinder block of an internal combustion engine, and 11 a conventional poppet valve reciprocably mounted therein. The valve 11 has an enlarged head 12 adapted to seat

2 upon a valve insert 13 mounted in the block, and a stem 14 slideably received within a valve guide bushing 16 mounted in a bore 17 in the block and held therein by means of a retainer 18. The lower end of the valve stem is adapted to be engaged by a tappet 19 actuated by a conventional cam (not illustrated). Adjacent its lower end the valve stem is provided with an annular groove 23 which receives the arcuate inwardly extending tongues 24 of a pair of identical semi-cylindrical keys 25.

The semi-cylindrical keys 25 are encircled by an intermediate retaining sleeve 27, the inner conical surface of which engages the outer conical surfaces of the keys. The resulting wedging action locks the ring and keys together under the axial load of the valve spring, and the valve stem, keys and intermediate sleeve reciprocate and rotate together.

A valve spring retainer 28 encircles the intermediate sleeve 27 and is provided with a lower radially outwardly extending flange 29 upon which the lower end of the valve spring 31 is seated. The upper end of the valve spring 31 is engaged by an annular shoulder 32 provided in the valve guide bushing 16. The construction thus far described is conventional.

The device of this invention is provided for positioning between the end of the valve stem and the actuation device for the stem. The illustrated embodiment of the invention, in its preferred form, is indicated by the reference character 35. This construction may generally be referred to as a sacrifice cap 35 and, in the form illustrated, provides a plate or shim portion 36 which is the actual member for fitting between the stem and the actuating device. In order to conveniently hold the plate 36 against lateral displacement, means have been provided to prevent its lateral shifting by presenting interference surfaces to engage one or the other of the cooperating members. The cap 35 is thus provided with a cup portion 37 defined by side walls 38. The method of manufacturing preferably comprises the drilling of a blank by a flat bottom tool to provide the cup portion 37. Grinding procedure then will provide a smooth flat bottom surface 39 for engagement by the tappet 19 or other actuation device. The device of this invention is useful in new equipment to prevent scoring and wear on the cooperating members, or may be used in old equipment to repair situations wherein the scoring has already taken place. The member is described as a sacrifice cap because whenever it becomes worn, it is easily replaced with a new member.

However, a cap which is fixed with respect to the end of the valve stem would serve only one purpose if it were not rotated during use to continually distribute the wear and prevent early deterioration of the members. In the drawings, and in the early part of this description, a construction has been set forth which will cause a slow rotation of the valve 11 for the purpose of preventing the accumulation of carbon between the insert 13 and the head 12 of the valve 11. The present invention is equally useful in a device which does not have any positive rotation provision. It is desirable to have the sacrifice cap 35 turn independently of any provision for rotation of the valve 11. Therefore, the cup portion 37 is provided with loose fit with respect to the end of the stem 14, and is free to rotate with respect to the stem 14 if some force will cause such rotation.

It has been found that by making the sacrifice cap 35 loose in the manner described, the lubricating oil of the engine will work its way into the cup portion 35 and thereby provide a cushion to prevent extreme mechanical shock when the tappet 19 comes into engagement to force the valve 11 against the urge of spring 31. This oil film, it has been found, serves another very desirable function besides cushioning. With such oil film in place while the tappet 19 is away far enough to provide a space between the members, the oil will accumulate in thicker layers or droplets. Whenever the tappet comes into contact to move the valve against the urge of spring 31, the oil will tend to move into a thinner, even layer. This rush of oil, although in very minute quantity, is unbalanced and causes a rotative force which will reposition the cap 35 with respect to the cooperating stem 14 and tappet 19.

Although the oil film collection alone has been found to cause some rotation, a very unusual reaction has been obtained by the provision of magnetic means in the sacrifice cap 35. The most satisfactory method of providing such magnetic means is simply to produce the entire cap of a magnetized material. The illustrated embodiment of such a cap is magnetized.

It would appear that magnetizing the cap 35 would cause that cap to cling to one or the other of the members 14 or 19, and thus prevents the desired rotation which has been spoken about. Actually, it has been found that the magnetic nature of cap 35 will cause the cap 35 to have an almost equal attraction for the members 14 and 19. Therefore, there is a strong unbalance and the cap may be easily urged to cling to one or the other, and actually does alternately cling with one or the other. Apparently, although no direct evidence is available to prove or disprove the theory, the presence of an oil film is the factor which influences the alternate clinging of the cap 35 to one member or the other. Apparently such oil film augments the attraction in one instance and opposes it in another instance by its own surface tension and formation of vacuum areas. Whatever may be the reason, and this invention is not predicated upon any theory, it has been shown that the cap 35, when provided with a magnetic attraction characteristic, will alternately cling to one and then the other of members 14 and 19, and in so doing tends to flutter and rotate in the desired manner which prolongs the life of the tappet 19, and the stem 14, and the sacrifice cap 35 itself.

Another feature which has been discovered resulting from the use of the magnetic characteristic of cap 35 is the collection of metallic dust and fine chips which result from wear of the valve and its associated members. This feature is believed to be quite important. It is true, of course, that the conventional filter normally employed with most internal combustion engines will remove most such abrasive dust. However, the dust must be carried through the oil system to the filter before it can be removed. During the interim period of time before the oil does reach the filter, it can cause considerable damage to the engine parts. Therefore, the elimination of any amount of such abrasive metallic dust is a decided beneficial factor for the engine. It has been found, after the use of magnetized cap 35 for a period of time, that the exterior surfaces of the cap not directly contacted by the stem 14 and the tappet 19 has a considerable layer of such dust encrusted thereon. This dust undoubtedly is produced by the wear on the stem 14 and the associated members of the valve mechanism. By collecting on the surface of the cap 35 it is effectively neutralized directly where produced and, accordingly, cannot be carried further into the engine to aggravate wear on other parts by acting as an additional abrasive.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What I claim is:

1. A sacrifice cap device positionable between a valve stem and valve actuation device, comprising, a magnetized shim member, and interlocking surface means to hold said member against lateral displacement with respect to a valve stem.

2. In an internal combustion engine construction having a poppet valve with a valve stem, a pusher device to contact the end of said valve intermittently and push said valve stem in a longitudinal direction to unseat the valve, and a spring tending to hold said valve seated, the provision of an intermediate member of magnetized ferrous material between the end of said valve stem and said pusher device, comprising, a plate member lying in a plane transverse to the longitudinal axis of said stem between said stem and said pusher device, interference retainer means restricting said plate member against lateral displacement from the position between stem and pusher without otherwise restricting the free movement thereof.

References Cited in the file of this patent

UNITED STATES PATENTS

| | | |
|---|---|---|
| Re. 20,291 | Bock | Mar. 9, 1937 |
| 1,613,012 | Baker | Jan. 4, 1927 |
| 2,590,719 | MacPherson | Mar. 25, 1952 |

FOREIGN PATENTS

| | | |
|---|---|---|
| 639,857 | France | July 2, 1928 |